United States Patent [19]

Kline et al.

[11] Patent Number: 4,913,189

[45] Date of Patent: Apr. 3, 1990

[54] CLIMATE CONTROL SYSTEM CONTROL MODULE

[75] Inventors: Loren H. Kline, Oregon, Ohio; Eddie L. Johnson, Detroit, Mich.; John G. Berent, Madison Heights, Mich.; James T. McIntyre, Sterling Heights, Mich.

[73] Assignee: Colt Industries Inc., New York, N.Y.

[21] Appl. No.: 324,766

[22] Filed: Mar. 17, 1989

[51] Int. Cl.[4] ............................................. F16K 11/00
[52] U.S. Cl. .................................... 137/560; 137/884
[58] Field of Search ................... 251/129.21; 137/560, 137/561 R, 884

[56] References Cited

U.S. PATENT DOCUMENTS 4,507,707 3/1985 Willis .................................. 137/884
4,567,910 2/1986 Flavin et al. ............... 251/129.21 X
4,785,848 11/1988 Leiber ............................. 137/884 X Primary Examiner—John Fox
Attorney, Agent, or Firm—Walter Potoroka, Sr.

[57] ABSTRACT

A control module for controlling the operation of multiple fluid pressure actuated devices and electrical devices, as in an automotive heating/cooling system, includes a one-piece sheet metal frame or bracket upon which a plurality of solenoid valves, circuit boards and a manifold are assembled in a compact, tightly, but easily assembled, package. The assembled package is of a generally rectangular box-shaped configuration with electrical and fluid flow connections located at one end to connect with electric and fluid connectors fixedly mounted on the vehicle to provide a simple plug-in-type installation of the module on the vehicle assembly line.

5 Claims, 2 Drawing Sheets

CLIMATE CONTROL SYSTEM CONTROL MODULE

BACKGROUND OF THE INVENTION

I. Field of the Invention

The present invention is directed to a control module employed to control the operation of the passenger compartment heating/cooling system of an automotive vehicle.

II. Description of the Related Art

In a typical present-day automotive heating/cooling system, a ducting system is provided with air flow directing doors which, by a control system, may be set selectively to supply heated air, cooled air from an air conditioner, or fresh outside air to the passenger compartment through discharge openings which direct the flow of air to the windshield and to other discharge openings which may discharge air from the dashboard and the floor. The control panel allows a selection of any of several different operating modes. Typically, positioning of the various doors or deflectors which control the path of air flow through the duct system is accomplished by a vacuum actuated motor which is selectively connected either to a vacuum source or to atmospheric vent by a solenoid controlled valve. A typical system will require four or more doors, each of which must have a solenoid valve to control actuation of its positioning vacuum motor. In addition to electrical circuitry for controlling energization and deenergization of the various solenoid valves, the system will require electrical control circuitry for controlling operation of the blower motor which induces the flow of air through the duct system and also circuitry and controls for controlling operation of the clutch associated with the air- conditioning compressor.

The operating controls for such systems typically take the form of electrical switches which must be mounted at a location within the reach of the driver of the vehicle, normally at the center of the dashboard at a location accessible both to the driver and to a front seat passenger. The increasing complexity and general down sizing of motor vehicles has drastically reduced the space available, particularly in the passenger compartment, for the mounting and installation of various components. As is always the case with automotive components, ease of installation on the assembly line is a prime consideration.

Thus, for a component, such as the heating/cooling system control system, a compact modular package is desirable. However, a compact, box-like control module which is capable of being installed in the vehicle simply by slipping it into place must in turn be so designed that it may itself be easily assembled because of the large number of such modules which must be produced. Ease of assembly is not always compatible with the achievement of a tight assembly, an important consideration in automotive applications where the assembled device is subject to vibration and jolting inherent in the normal operation of the vehicle.

The climate control system control module of the present invention is directed to the solution of the foregoing problems.

SUMMARY OF THE INVENTION

A control module embodying the present invention mounts a plurality, typically four or more, solenoid valves, two electrical circuit boards, one of which includes a plurality (typically seven) of control switches and a manifold for conducting vacuum to and from the various valves upon a one-piece bracket, all in a small assembled package which may be enclosed within a small rectangular box, open at one end from which electrical connectors and vacuum hose nipples project.

The solenoid valves, circuit boards and manifold are all assembled upon a bracket which is formed from a single piece of sheet metal by a progressive die. The bracket is formed with a horizontal base with two spaced parallel webs which project vertically upwardly from the base and extend transversely of the bracket. One of the webs is of a single thickness of sheet metal, while the other web is folded downwardly from its upper edge to provide a web of double thickness of sheet metal. This double thickness web is formed with a plurality of generally U-shaped recesses extending downwardly from the upper edge of the web, one recess being provided for each solenoid valve required. The solenoid valves include a bobbin upon which the solenoid coil is wound and an extension projecting coaxially from one end of the bobbin constitutes a valve housing. The bobbin is formed with a circumferential groove or recess at a location axially between one end of the coil and the valve housing projection, and the recesses in the doubled web of the bracket and the circumferential groove in the solenoid bobbin are so dimensioned that the solenoid valve may be mounted upon the bracket by pushing the valve downwardly into one of the U-shaped recesses which will receive and snugly fit into the groove in the solenoid bobbin. The two vertical webs on the bracket are so spaced from each other that when the circumferential groove in the bobbin is seated in the recess of the double thickness bracket, the opposite end of the solenoid bobbin is firmly pressed against the opposed single thickness vertical web.

A manifold is formed at one side thereof with a plurality of recesses, each located to sealingly receive the projecting valve housing portion of the bobbin of a solenoid valve mounted on the bracket. The manifold is fixedly secured to the bracket by means of mounting bolts which pass through the manifold and are threadably received within mounting legs integrally formed on the bracket.

The manifold is provided with a plurality of vacuum hose receiving nipples. Internal passages within the manifold establish a common connection within the manifold between a first nipple intended to be connected to a vacuum source and a first port of each solenoid valve, while other nipples are respectively connected via the manifold to control ports of the respective solenoid valves.

Additional mounting legs integrally formed on the bracket serve to assemble a first circuit board to the bracket in overlying relationship to the solenoid valves and to mount a second control switch carrying circuit board at the side of the bracket opposite that to which the manifold is mounted. The first circuit board includes an appropriate number of spade or pin-type electrical connectors projecting from the board, through openings in the manifold to a connector receiving recess in the same side of the manifold from which the vacuum hose nipples connect.

The assembled components described above may be fitted within a rectangular box open at one end so that the assembly, switch side first, can be inserted into the box with the switch buttons projecting through openings in the front end of the box. The electrical and vacuum connections are accessible at the open end of the box.

Alternatively, that circuit board which carries the switches may be mounted at a location remote from the assembled bracket, solenoid valves, manifold and first circuit board assembly and electrically connected to the first circuit board of the assembly by appropriate wiring.

Other objects, features and advantages of the invention will become apparent by reference to the following specification and to the drawings, which are only representative of one modification of the invention and not intended to limit the same, other modifications thereof being possible.

DESCRIPTION OF THE PREFERRED EMBODIMENT

Figure 1:
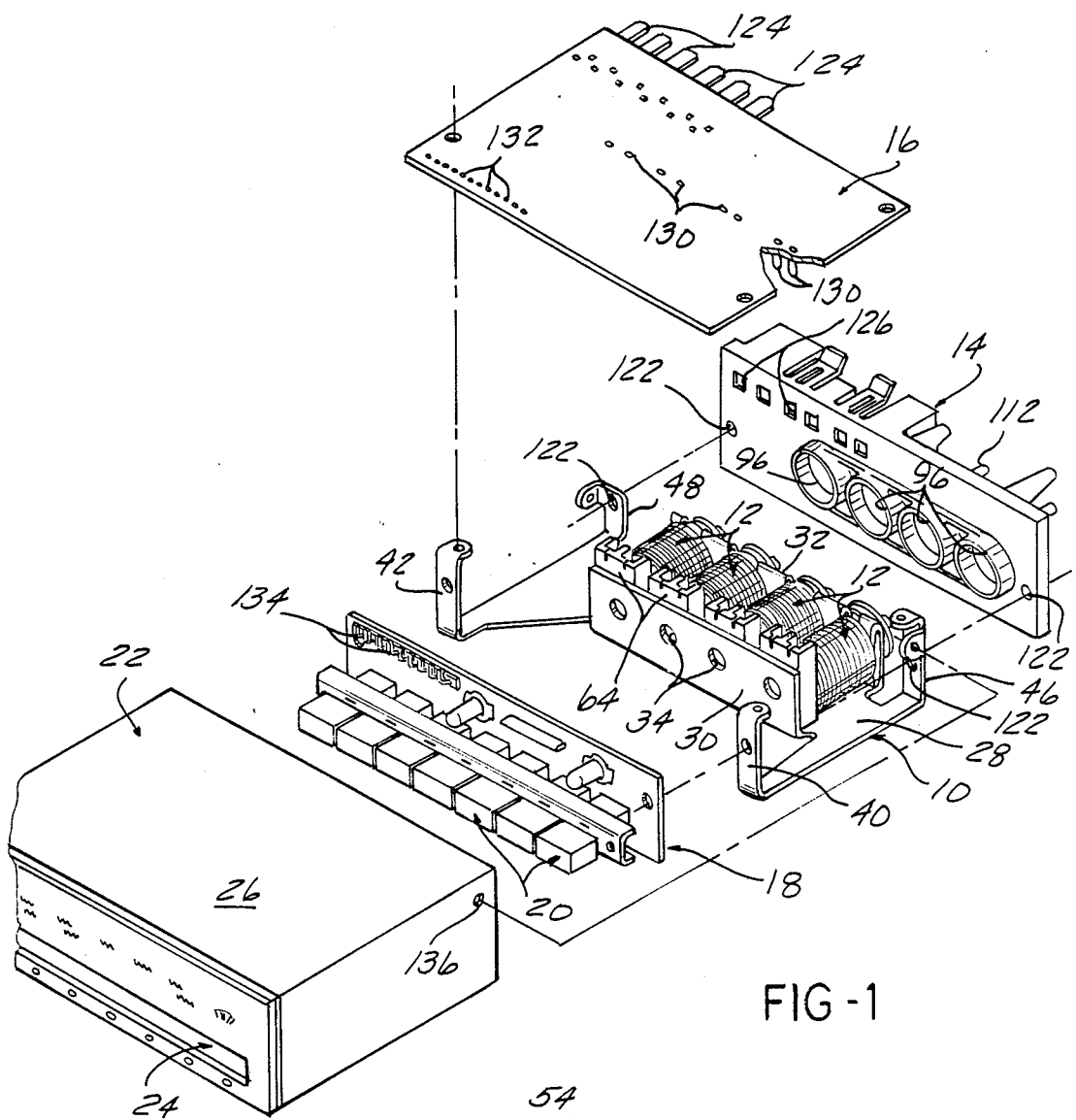
FIG. 1 in an exploded perspective view showing the component subassemblies of an exemplary control module embodying the present invention.

Referring first to FIG. 1, one form of control module for an automotive heating/cooling system is disclosed in an exploded view in which certain components or subassemblies of the module are separated from each other. The components of the module include a main frame or bracket 10 upon which are preliminarily assembled four solenoid valves respectively designated generally at 12. A vacuum manifold designated generally 14 is adapted to be sealingly connected simultaneously to the four valves 12. Except for the two small plastic plugs to be ultrasonically welded (or spin welded) to seal off the ends of passage 108, manifold 14 preferably is of a one-piece construction molded of a suitable thermoplastic material. Other components of the module include a first circuit board designated generally 16, a second circuit board designated generally 18 which includes a plurality of push-button type electrical switches indicated generally at 20, and a hollow box-like housing or enclosure designated generally 22, open at the end facing circuit board 18 in FIG. 1 and adapted to enclose board 18, board 16, bracket 10 and solenoid valves 12 when these latter elements are assembled to each other in a manner to be described below. The front side of enclosure 22 is formed with an opening 24 through which the push buttons of switches 20 will protrude. The module may also include a separable legend plate 26 identifying the functions of the various switches.

Figure 2:
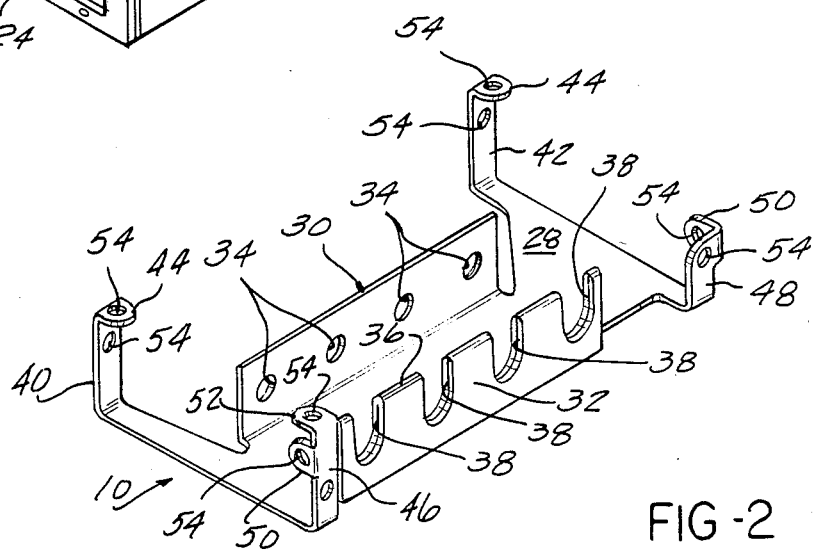
FIG. 2 is a perspective view of the bracket of the assembly of FIG. 1.

Referring now to FIG. 2, bracket 10 is shown by itself in a perspective view. Bracket 10 is formed from a single piece of sheet metal material and is readily adapted to be mass produced by a progressive die operation. Typically, the sheet metal material of bracket 10 will be approximately 1/16 inch thick. Bracket 10 is formed with a flat horizontal base portion from which two webs 30 and 32 project vertically upwardly in spaced parallel relationship to each other. Web 30 may be of a single thickness of sheet metal and has a plurality of pole piece 78 locating means, for magnetic contact of the pole piece with the magnetic bracket 10, which serves both as a flux path and a mechanical retention for the solenoid valves, the pole piece locating means comprising spaced slots, dimples or recesses (not shown) or circular openings 34 punched through the web. As shown, web 32 is folded down from its upper edge 36 so that web 32 is formed of a double thickness of sheet metal. A plurality of U-shaped recesses 38 are cut through both thicknesses of web 32 and extend downwardly from the upper edge 36 of web 32. The number of recesses 38 in web 32 and openings 34 in web 30 correspond to the number of solenoid valves 12 (see FIG. 1) which are to be assembled in the module.

Bracket 10 may also be formed at what will be referred to as its front end with a pair of mounting legs 40, 42 which project vertically upwardly from the base portion 28 of bracket 10 and are formed with integral mounting tabs 44 at their upper end. At the rearward end of bracket 10, additional mounting legs 46, 48 project vertically upwardly from base portion 28. Leg 46 is formed with a forwardly projecting side tab 50 and a top tab 52. Leg 48 is formed with a side tab 50, but does not require a top tab 52 as is employed on leg 46. The various mounting legs and tabs are formed with suitably located bores 54 which may be tapped or may receive sheet metal screws to attach various other components to bracket 10. Other equivalent means, such as fold over tabs or spring tabs or clips, may be used to connect bracket 10 to manifold 14.

Figure 3:
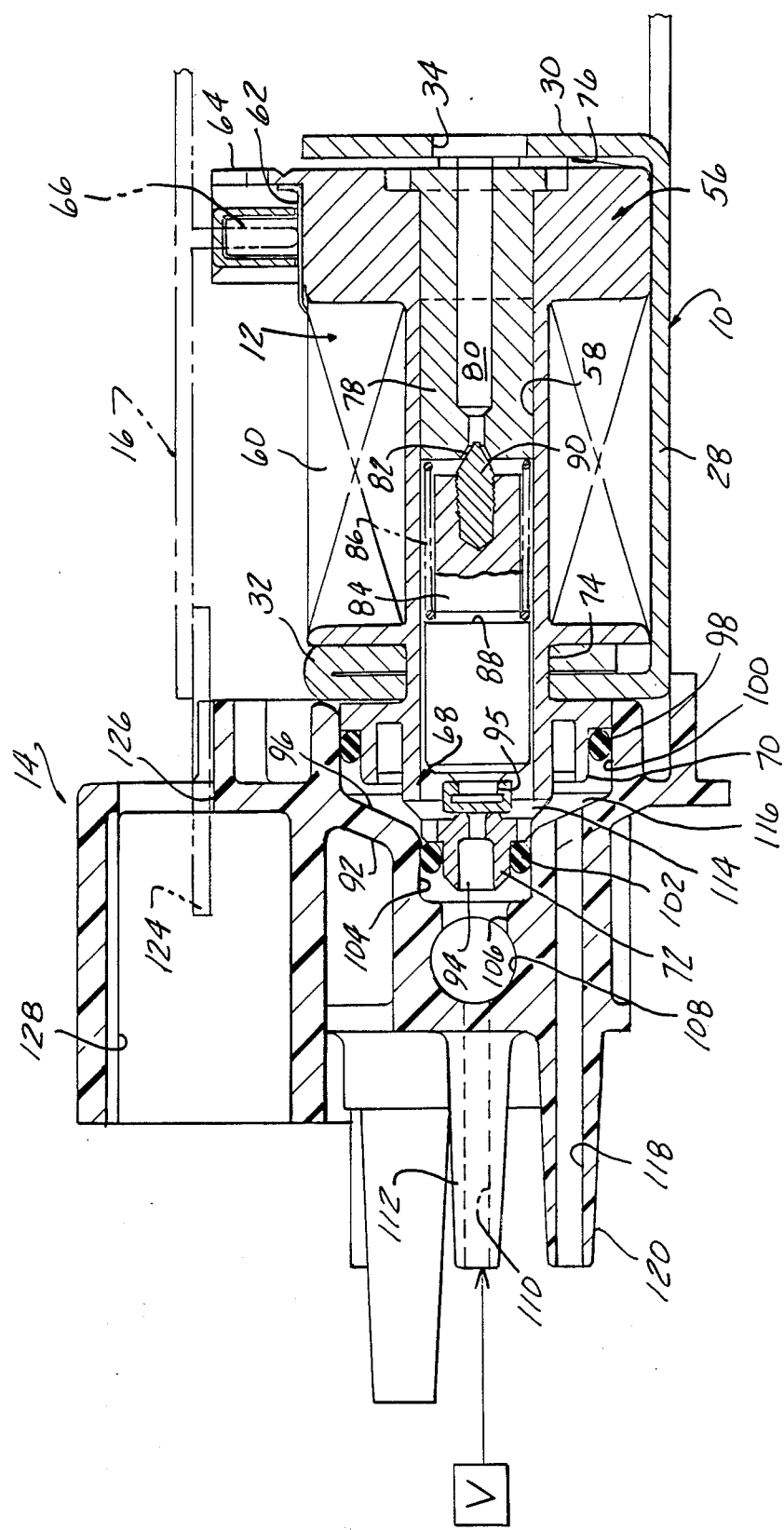
FIG. 3 is a detail cross-sectional view taken through one solenoid valve and a connected portion of the manifold of the module in their assembled relationship with each other.

All of solenoid valves 12 are of identical construction, and structural details of the valves are best seen in FIG. 3. Each valve 12 includes a one-piece combination solenoid bobbin/valve housing designated generally 56 having a central bore 58. The solenoid coil 60 is wound upon bobbin 56 and the opposite ends of the coil winding as at 62 are led into a connector block portion 64 integrally formed on the bobbin and mounting a pair of electrical connector sockets, one socket being electrically connected to one end of the coil winding. With the exception of connector block 64, the bobbin/valve housing 56 is of circular transverse cross-sectional configuration.

At the end of bobbin 56 remote from connector block 64, a valve housing portion designated generally 68 projects and includes a relatively large diameter portion 70 from which in turn projects a relatively small diameter portion 72. Between valve housing projection 68 and solenoid coil 60, the bobbin is formed with a circumferential groove 74 of a width which, as best seen in FIG. 3, is substantially equal to the thickness of the doubled thickness web 32 of bracket 10. The diameter of the bottom of circumferential groove 74 is substantially equal to the spacing between the vertical side walls of recesses 38 in web 32 and the curved bottom of each recess 38 is curved on a radius equal to that of the radius of inner wall of groove 74. Thus, the solenoid bobbin can be easily mounted upon bracket 10 by seating the groove 74 in a recess 38 of the bracket. One or more wedge-shaped projections 76 at the opposite end of the bobbin will engage the facing surface of web 30 of bracket 10 so that a solenoid valve may be easily assembled into bracket 10 and firmly frictionally retained in its assembled position by the engagement between the wedge-shaped projection 76 and web 30 and the engagement of the recesses 38 of web 32 in the circumferential groove 74 of the bobbin.

The right-hand end of bore 58 through bobbin 56 is plugged by a pole piece 78 having a central passage 80 extending through pole piece 78 to terminate at a conical valve face 82 at the inner end of the passage. A solenoid armature 84 is mounted within bore 58 for sliding movement relative to the bore and is biased to the left as viewed in FIG. 3 by a compression spring 86 engaged between the inner end of pole piece 78 and a shoulder 88 on armature 84. A valve head 90 is carried by the armature for movement into and out of wasted engagement with valve seat 82, the valve being shown in FIG. 3 with head 90 spaced from said 82 to permit passage 80 to be in fluid communication past the sides of the loosely fitting armature with a control chamber 92 in valve housing portion 68. A valve head 95 carried by the armature 84 is shown in a seated position in which control chamber 92 is sealed from a valve port 94 at the extreme left-hand end of the valve housing.

In FIG. 3, the valve 12 is shown in operative seated engagement in a recess 96 in manifold 14. A large diameter O-ring around the large diameter portion 70 of housing portion 68 provides a fluid-tight seal with the inner wall of a large diameter portion 100 of recess 96, while a second or small diameter O-ring 102 provides a seal between the small diameter end portion 72 of the housing and a small diameter inner end portion 104 of recess 96. A passage extends from the small diameter portion 104 of recess 96 to open into a transverse passage 108 in manifold 14 which is connected to a vacuum inlet passage 110 through a nipple 112 formed on manifold 14.

A transverse passage 114 places chamber 92 of the valve in fluid communication at all times with that space within recess 116 which is between O-ring seals 98 and 102. The space 116 is in turn, for the particular valve 12 shown connected at all times to a passage 118 opening through a second nipple 120 on manifold 14. Nipple 120 is adapted to be connected to a door operating motor, not shown, in the duct system, not shown, of an automotive heating/cooling system to be controlled by the control module.

As seen in FIG. 3, port 94 of valve 12 is in fluid communication at all times with a vacuum induced in passage 108 by the connection of a vacuum source, not shown, to passage 110 in nipple 112. At the opposite end of bobbin 56, passage 80 opens to atmosphere at its right-hand end, passage 80 being aligned with the opening 34 in web 30 of bracket 10 to provide a vent communication of passage 80 to atmosphere necessary for free operation of armature 84. As shown in FIG. 3, it is assumed that solenoid coil 60 is deenergized, and spring 86 biases armature 84 to the left-hand position shown, at which atmospheric pressure in passage 80 can pass through bore 58 past armature 84 into control chamber 92 and thence from chamber 92 through port 116 to the passage 118 which is connected to a vacuum motor to vent the motor to atmospheric pressure. Upon energization of the solenoid coil 60, armature 84 is attracted to the right as viewed in FIG. 3 to seat valve head 90 on valve seat 82, blocking passage 80, while at the same time valve head 95 is retracted clear of port 94 to place control chamber 92 in communication with the vacuum source and enable the vacuum to actuate the vacuum motor, not shown, connected to passage 118.

Referring now to FIG. 1, it is seen that manifold 14 is formed with four recesses 96 so located as to be aligned with the four solenoid valves 12 mounted on bracket 10. When the manifold is moved to its assembled relationship relative to the valves, as shown in FIG. 3, the manifold is secured in this position to the bracket by mounting screws (not shown) which are passed through bores 122 in manifold 14 to be threaded into aligned bores in the appropriate mounting leg of bracket 10. As stated above, the simple seating of the solenoid valves 12 in bracket 10 as in the exploded view of FIG. 1 frictionally clamps the valves in position on the bracket. An additional mechanical interlock between the valves and bracket 10 is achieved when the valve housing portions of the respective valves are seated within the recesses 96 of manifold 14 and manifold 14 in turn is fixedly secured to bracket 10.

Circuit board 16 has an appropriate printed electrical circuit on its undersurface as viewed in FIG. 1. Also mounted upon circuit board 16 are various groups of electrical connectors. A first of these groups includes a plurality of prongs 124 mechanically secured to the board and electrically connected to the printed circuit. Prongs 124 project from one edge of the board and, when board 16 is assembled upon bracket 10 in a manner to be described below, prongs 116 project through openings 126 in manifold 14 into a recess 128 (FIG. 3) in the manifold which is dimensioned to receive a connector block having sockets aligned with prongs 124 to provide an electrical connection between the printed circuit of the board and a power source and other external devices controlled by the circuit on board 16.

A second group of connectors mounted on board 16 include a plurality of pins 130 fixedly mounted in the board and located to be received within the sockets of the connector block 64 of the respective solenoid valves 12 to electrically connect the coils of the solenoid to the printed circuit.

The third group of connectors on board 16 takes the form of a plurality of socket connectors indicated at 132 electrically connected into the printed circuit on board 16.

Board 18 likewise mounts a printed circuit electrically connected to the various push-button switches 20. A plurality of means such as connector pins 134 project upwardly from board 18 to be received within the sockets 132 on board 16. Alternatively, means such as a flexible ribbon cable (well-known in the art, but not shown) can be used for this purpose.

Board 18 likewise mounts a printed circuit electrically connected to the various push-button switches 20. A plurality of connector pins 134 project upwardly from board 18 to be received within the sockets 132 on board 16.

Referring now to FIG. 1, the various components shown in FIG. 1 are assembled to each other as follows.

The four solenoid valves 12 are assembled as indicated in FIG. 1 onto bracket 10. As described above, this is done simply by pushing the solenoid valve vertically downwardly into position between webs 30 and 32 of the bracket, the valves being frictionally clamped in the assembled position.

Circuit board 18 is then mounted upon legs 40 and 42 of bracket 10 by mounting screws.

Circuit board 16 is then vertically lowered to engage sockets 132 in board 16 with pins 134 on the assembled board 18 and to simultaneously insert the pins 130 of boards 16 into the sockets in the connector blocks 64 of the solenoid valves. Board 16 is then fastened in position by any suitable means such as, for example, mounting screws which pass through the board into the three top mounting tabs on legs 40, 42 and 46.

Manifold 14 is then advanced horizontally toward bracket 10 to receive the projecting valve housing portions of valves 12 in the respective recesses 96 and simultaneously passing prongs 124 on the assembled board 16 through the openings 126 in manifold 14. Manifold 14 is then attached to legs 46 and 48 of bracket 10 by mounting screws passing through openings 122 in manifold 14 and legs 46 and 48.

The assembly completed to the stage described above is then inserted into the open end of box-like enclosure 22, and enclosure 22 is secured to bracket 10 by mounting screws which pass through bores 136 in the opposite sides of box 22 to be threadably received in the side mounting tabs on legs 46 and 48 of the bracket. The push buttons of switches 20 will protrude at this time through opening 24 in the front end of box 22.

This last assembly leaves the various nipples 112, etc. of manifold 14 exposed at the open side of box 22, and the electrical connector prongs 124 on board 16 likewise protrude through openings 126 into recess 128 which is likewise exposed at the open end of box 22.

In a typical assembly line installation procedure, a terminal block having electrical and fluid connector sockets aligned to receive the prongs 124 and nipples on the manifold is fixedly mounted at the appropriate location on the vehicle; and at a subsequent station on the assembly line, the module is simply pushed onto this terminal block to make the external electrical and vacuum connections simultaneously. With this technique, the module is bodily removable as a unit for repair or replacement purposes.

In an alternative arrangement, not shown in the drawings, the push-button switches shown as being mounted directly upon circuit board 18 may be separated from the board so that they may be mounted at some location on the vehicle which is remote from the remaining components of the module, to which the switches may be electrically connected as by a multi-conductor cable. All or part of the printed circuit on board 18 may be located with the switches. One alternative to the conventional dashboard location of switches 20 is on the steering wheel, for example.

The one-piece bracket 10 is an important element of the present invention in that it not only may be readily mass produced by a progressive die because of its one-piece sheet metal construction, but also because of the fact that it incorporates in one part functions and capabilities which in prior art devices required the use of several separate parts. In one earlier prior art module, some sixteen individual parts were required to perform the functions performed by bracket 10 in the present module. The one-piece construction provides obvious advantages both from part fabrication and assembly considerations.

While one exemplary embodiment of the invention has been described in detail, it will be apparent to those skilled in the art the disclosed embodiment may be modified. Additionally, while the invention has been shown and described as applied to an automotive heating/cooling system, it is apparent that it can be employed in industrial and other systems where it is desired to direct the flow of any liquid, gas, pressure or vacuum to locations of need.

What is claimed is:

1. A multiple solenoid valve assembly comprising a plurality of like solenoid valves each comprising a solenoid bobbin/valve housing having a central longitudinal axis, a solenoid coil wound about said bobbin in coaxial relationship to said axis, first electrical connector means at one end of said bobbin, first fluid connector means projecting coaxially from the other end of said bobbin, and means defining a circumferential groove in said bobbin between said connector means and the adjacent end of said coil, a mounting bracket comprising a single piece of sheet metal having a flat horizontal base having parallel front and rear edges, a first retaining web on said bracket integral with said base along said front edge and projecting vertically upwardly from said front edge, a second retaining web on said bracket integral with said base along said rear edge projecting vertically upwardly from said base in spaced opposed parallel relationship with said first web, means defining a plurality of upwardly opening recesses in said second web, each of said recesses being adapted to snugly engage the circumferential groove of one of said solenoid bobbins to fixedly locate one of said solenoid valves in an assembled position on said bracket with said one end of said valve seated against said first web and said first fluid connection means of said valve projecting rearwardly from said second web, a manifold including a plurality of second fluid connection means adapted to respectively sealingly mate with the first fluid connection means of said solenoid valves when said valves are assembled in said bracket, first electrical circuit board means including a plurality of second electrical connector means adapted to respectively mate with the first electrical connector means of said solenoid valves when said valves are assembled in said bracket, and mounting leg means integrally formed on said bracket for fixedly assembling said manifold and said circuit board means to said bracket with the respective fluid and electrical connector means of said manifold and said bracket mated with the fluid and electrical connector means of said valves.

2. The invention defined in claim 1 wherein said first circuit board means is of a flat, generally rectangular configuration and said mounting leg means assemble said first circuit board means on said bracket in a horizontal position overlying said valves in said bracket and projecting forwardly beyond said first web, said first circuit board means including a plurality of third electrical connector means adjacent its forward edge, second circuit board means of a flat, generally rectangular configuration including fourth electrical connector means adapted to mate with said third electrical connector means when said second board means is in a vertical assembled position extending downwardly from said forward edge of said first board means, fastening means on said mounting leg means for fixedly securing said second board means in said assembled position upon said bracket with said third and fourth electrical connector means mated with each other, and manually operable electrical switch means on said second board means located on the front side thereof when said second board means is assembled to said bracket by said fastening means.

3. A control module for controlling the operation of an automotive heating/cooling system or the like having fluid pressure operated devices and electrical devices including a first electrical connector means connected to said electrical devices; said module comprising a one-piece sheet metal frame having a horizontal base portion, a first and a second web integral with and projecting upwardly from said base portion in spaced parallel relationship with each other, first and second mounting leg means integral with and projecting upwardly from said base portion, a plurality of like solenoid actuating valves having valve port means projecting from one end thereof, cooperable means on said valves and at least one of said first and second webs for frictionally assembling said valves upon said frame in adjacent relationship with each other with the valve port means of said valves projecting in spaced parallel relationship with each other through and beyond one of said first and second webs, a manifold having a plurality of valve port means receiving recesses in one side thereof located to simultaneously sealingly receive the valve port means of said valves when said valves are assembled on said frame by said cooperably means, means for detachably assembling said manifold upon said first mounting leg means with said valve port means received in said valve port receiving recesses, fluid connection means on the side of said manifold opposite said one side for connecting said at least one valve port means to a fluid pressure source and for respectively connecting others of said valve port means to said fluid pressure operated devices, first circuit board means including second electrical connector means projecting from one edge of said first board means and third electrical connector means at one side of said board, said manifold having a recess in said opposite side adapted to receive said first electrical connector means and an opening therethrough from said one side thereof opening into said connector means receiving recess, said solenoid valves having fourth electrical connector means adapted to electrically connect to said third connector means, and means on said first and second mounting leg means for detachably assembling said circuit board means on said frame with said board means overlying said valves and said third and fourth connector means electrically connected to each other and said second connector means projecting through said opening into said first connector receiving recess.

4. The invention defined in claim 3 further comprising second circuit board means including a plurality of electrical switches at one side thereof and fifth electrical connector means adjacent an upper edge of said second board means, sixth electrical connector means on first circuit board means adjacent the edge of said first board means opposite said one edge adapted to electrically connect to said fifth connector means, and means for detachably mounting said second board means on said second mounting leg means with said fifth connector means electrically connected to said sixth connector means.

5. The invention defined in claim 4 further comprising a hollow, rectangular, box-shaped enclosure open at one end and having an access opening in its opposite end, and means for detachable assembling said enclosure to said frame with the assembled frame, solenoid valves, manifolds and first and second circuit board means received within said enclosure and with said fluid connector means located at said one end of said enclosure and said switch means located within said access opening and accessible from the exterior of said enclosure.

* * * * *